United States Patent
Ryu et al.

(10) Patent No.: US 9,034,189 B2
(45) Date of Patent: May 19, 2015

(54) PRESSURIZED HOLLOW FIBER MEMBRANE MODULE

(75) Inventors: Jae Hee Ryu, Seoul (KR); Yong-Cheol Shin, Seoul (KR); Kwang-Jin Lee, Yongin-si (KR); Moo-Seok Lee, Seoul (KR)

(73) Assignee: KOLON INDUSTRIES, INC., Gwacheon-si (KR)

( * ) Notice: Subject to any disclaimer, the term of this patent is extended or adjusted under 35 U.S.C. 154(b) by 91 days.

(21) Appl. No.: 14/114,840

(22) PCT Filed: Jun. 21, 2012

(86) PCT No.: PCT/KR2012/004897
§ 371 (c)(1),
(2), (4) Date: Oct. 30, 2013

(87) PCT Pub. No.: WO2012/177058
PCT Pub. Date: Dec. 27, 2012

(65) Prior Publication Data
US 2014/0076793 A1 Mar. 20, 2014

(30) Foreign Application Priority Data
Jun. 21, 2011 (KR) .................. 10-2011-0059992

(51) Int. Cl.
| | |
|---|---|
| *B01D 63/04* | (2006.01) |
| *B01D 69/08* | (2006.01) |
| *B01D 69/12* | (2006.01) |
| *B01D 71/68* | (2006.01) |

(Continued)

(52) U.S. Cl.
CPC .............. *B01D 63/04* (2013.01); *B01D 63/021* (2013.01); *B01D 69/08* (2013.01); *B01D 69/10* (2013.01); *B01D 2325/40* (2013.01); *B01D 63/027* (2013.01); *B01D 2313/23* (2013.01); *B01D 69/12* (2013.01); *B01D 71/34* (2013.01); *B01D 71/48* (2013.01); *B01D 71/68* (2013.01)

(58) Field of Classification Search
CPC ........... B01D 2313/23; B01D 2325/40; B01D 63/021; B01D 63/027; B01D 63/04; B01D 69/08; B01D 69/10; B01D 69/12; B01D 71/34; B01D 71/48; B01D 71/68
See application file for complete search history.

(56) References Cited

U.S. PATENT DOCUMENTS

| | | | |
|---|---|---|---|
| 5,198,110 A | 3/1993 | Hanai et al. | |
| 6,354,444 B1 * | 3/2002 | Mahendran et al. | .......... 210/490 |

(Continued)

FOREIGN PATENT DOCUMENTS

| | | |
|---|---|---|
| CN | 1488430 A | 4/2004 |
| JP | 02213356 A | 8/1990 |

(Continued)

*Primary Examiner* — John Kim
(74) *Attorney, Agent, or Firm* — Sughrue Mion, PLLC

(57) ABSTRACT

Disclosed is a pressurized hollow fiber membrane module that exhibits improved durability without deterioration in packing density and permeation flux. The pressurized hollow fiber membrane module includes a composite hollow fiber membrane comprising a tubular braid woven by yarns and a polymer film on the outer surface of the tubular braid. At least one of the yarns comprises a small-fineness filament and a medium-fineness filament. The small-fineness filament comprises first monofilaments having a fineness of 0.01 to 0.4 denier, the medium-fineness filament comprises second monofilaments having a fineness higher than 0.4 and lower than 3, and a ratio of thickness of the tubular braid to outer diameter thereof is 15 to 35%.

8 Claims, 2 Drawing Sheets

(51) Int. Cl.
  *B01D 71/34* (2006.01)
  *B01D 71/48* (2006.01)
  *B01D 63/02* (2006.01)
  *B01D 69/10* (2006.01)

(56) References Cited

U.S. PATENT DOCUMENTS

| 2003/0098275 A1* | 5/2003 | Mahendran et al. ......... 210/490 |
| 2008/0305290 A1 | 12/2008 | Lee et al. |
| 2010/0024631 A1 | 2/2010 | Lee et al. |

FOREIGN PATENT DOCUMENTS

| JP | 04227030 A | 8/1992 |
| JP | 09173729 A | 7/1997 |
| JP | 2009517199 A | 4/2009 |
| JP | 2009517200 A | 4/2009 |
| JP | 2009160582 A | 7/2009 |
| JP | 2009297642 A | 12/2009 |
| JP | 201036183 A | 2/2010 |
| KR | 10-2008-0048147 A | 6/2008 |
| KR | 10-2008-0074038 A | 8/2008 |
| KR | 10-2010-0092227 A | 8/2010 |
| KR | 10-2011-0055825 A | 5/2011 |
| WO | 2007064124 A1 | 6/2007 |

* cited by examiner

PRESSURIZED HOLLOW FIBER MEMBRANE MODULE

TECHNICAL FIELD

The present invention relates to a pressurized hollow fiber membrane module. More specifically, the present invention relates to a pressurized hollow fiber membrane module that satisfies high permeation flux, easy membrane cleaning and superior durability.

BACKGROUND ART

Separation methods for water treatment include a heating or phase-change method, a filtration membrane method, and the like. According to the filtration membrane method, it is possible to obtain the water of quality as desired by controlling the size of the fine pores of the filtration membrane, which advantageously improves the reliability of process. Furthermore, since the filtration membrane method does not require a heating process, it can be advantageously used for water treatment using microorganisms that could be adversely affected by heat.

Among the filtration membrane methods is a method using a hollow fiber membrane module in which hollow fiber membranes are disposed in the form of a bundle. Conventionally, the hollow fiber membrane module is widely used in the field of precision filtration such as preparation of sterile water, drinking water, ultrapure water or the like. Recently, the application field of the hollow fiber membrane module extends to sewage/waste water disposal, separation of solids in sewage disposal tank, removal of suspended solids (SS) in industrial waste water, filtration of stream water, filtration of industrial water, filtration of pool water and the like.

The hollow fiber membrane module may be classified into a submerged module and a pressurized module depending on operation manner thereof.

The submerged module is immersed in a bath containing fluids to be purified. As a negative pressure is applied inside the hollow fiber membrane, only pure fluid is allowed to permeate the membrane and come into the hollow thereof while the contaminants such as impurities or sludge remains outside the membrane. The submerged module is advantageous in that it can decrease the costs for setting up the facilities and operating thereof since it does not require fluid circulation. It is disadvantageous, however, in that its permeation flux that can be obtained per unit time is relatively low.

On the other hand, in a pressurized module, as a positive pressure is applied to the fluid outside the hollow fiber membrane, only pure fluid is allowed to permeate the membrane and come into the hollow thereof while the contaminants remains outside the membrane. Although the pressurized module requires additional equipments for fluid circulation, it facilitates relatively high permeation flux per unit time, as compared to submerged module.

The pressurized module has a structure in which a bundle of hollow fiber membranes are potted in a module case having a predetermined size. For this reason, the packing density of the bundle of hollow fiber membranes is important in terms of a permeation flux. As the packing density increases, the whole area of the membranes increases, but, disadvantageously, the space in the module case for raw water to be filtered decreases and the membranes become more vulnerable to contamination. Also, when strong aeration cleaning is performed in order to prevent membrane contamination, the hollow fiber membrane may be impaired.

Accordingly, it is required that the pressurized filtration module of high permeation flux should have a superior durability so that the membranes could be cleaned without being impaired.

DISCLOSURE

Technical Problem

Therefore, the present invention is directed to a pressurized hollow fiber membrane module capable of preventing these limitations and drawbacks of the related art.

One aspect of the present invention is to provide a pressurized hollow fiber membrane module that satisfies the requirements of high permeation flux, easy membrane cleaning, and superior durability.

Other features and advantages of the present invention will be described below and will be partially apparent from the description. Otherwise, other features and advantages of the present invention will be understood from implementation of the present invention. The objects and other advantages of the present invention will be realized and accomplished by the configuration specified in the annexed drawings as well as the detailed description and claims.

Technical Solution

In accordance with one aspect of the present invention, there is provided a pressurized hollow fiber membrane module comprising: a module case comprising a raw water inlet and a filtered water outlet; a bundle of composite hollow fiber membranes disposed in the module case; a first fixing member in which one ends of the composite hollow fiber membranes are potted, the first fixing member being fixed on an inner surface of the module case; and a second fixing member in which the other ends of the composite hollow fiber membranes are potted, the second fixing member being fixed on the inner surface of the module case, wherein each of the composite hollow fiber membranes comprises a tubular braid woven by yarns and a polymer film on an outer surface of the tubular braid, wherein at least one of the yarns comprises a small-fineness filament and a medium-fineness filament, wherein the small-fineness filament comprises first monofilaments having a fineness of 0.01 to 0.4 denier, wherein the medium-fineness filament comprises second monofilaments having a fineness higher than 0.4 and lower than 3, and wherein a ratio of thickness of the tubular braid to outer diameter thereof is 15 to 35%.

The general description provided above and the detailed description provided below are provided only for illustration of the present invention and be construed as providing a more detailed description of inventions defined in claims.

Advantageous Effects

According to the present invention, a composite hollow fiber membrane is produced using a tubular braid having a ratio of thickness to outer diameter of 15 to 35%, and a pressurized hollow fiber membrane module is produced using the composite hollow fiber membrane. The pressurized hollow fiber membrane module made as such has high permeation flux, easy membrane cleaning and improved durability.

Other effects of the present invention will be described in detail below together with technical configurations associated therewith.

BRIEF DESCRIPTION OF THE DRAWINGS

The above and other objects, features and other advantages of the present invention will be more clearly understood from the following detailed description taken in conjunction with the accompanying drawings, in which.

BEST MODE

Those skilled in the art will appreciate that various modifications, additions and substitutions are possible, without departing from the scope and spirit of the invention. Accordingly, the present invention includes all alternations and modifications that fall within the scope of inventions described in claims and equivalents thereto.

Hereinafter, a pressurized hollow fiber membrane module according to one embodiment of the present invention will be described in detail with reference to the annexed drawings.

Figure 1:
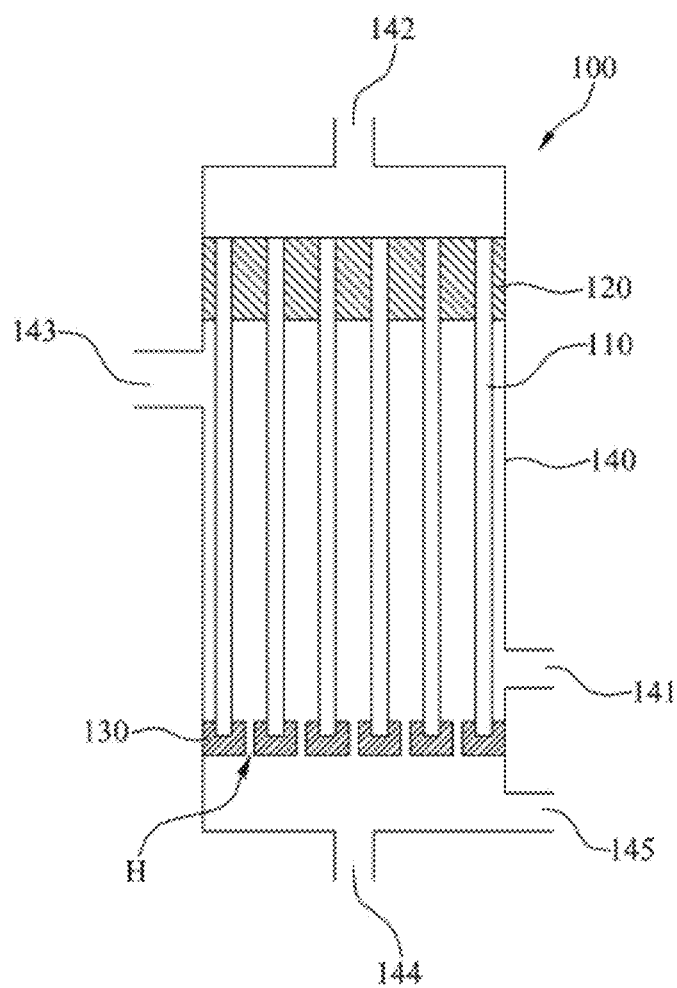
FIG. 1 is a cross-sectional view illustrating a pressurized hollow fiber membrane module according to one embodiment of the present invention.

FIG. 1 is a sectional view illustrating a pressurized hollow fiber membrane module according to one embodiment of the present invention.

The pressurized module 100 of the present invention includes a plurality of hollow fiber membranes 110. Each hollow fiber membrane 110 has a hollow inside thereof. During filtration, filtered water permeating through the membrane 110 is obtained inside the hollow fiber membrane 110. The plurality of hollow fiber membranes 110 are in the form of a bundle evenly arrayed in a longitudinal direction.

The upper end of each hollow fiber membrane 110 is fixed on the upper part of a module case 140 via a first fixing member 120. The upper end of each hollow fiber membrane 110 remains open. The pressurized module 100 of the present invention further comprises a sealant between the first fixing member 120 in which the plurality of hollow fiber membranes 110 are potted and the inner surface of the module case 140, thus preventing filtered water that passes through the hollow fiber membrane 110, flows through the hollows and is discharged through the open upper end of the hollow fiber membrane 110, from being mixed with raw water.

The first fixing member 120 is made of a thermosetting resin, such as epoxy resin, urethane resin or silicone rubber. Optionally, a filler such as silica, carbon black or fluoro carbon is mixed with the thermosetting resin to improve strength of the first fixing member 120 and reduce curing-contraction.

Meanwhile, the lower end of each hollow fiber membrane 110 is fixed on the lower part of the module case 140 via a second fixing member 130 made of the material which is same as or different from the material of the first fixing member 120. Since the lower end of each hollow fiber membrane 110 is embedded in the second fixing member 130, fluid cannot flow into or be discharged from the hollow of the membrane 110 via the lower end.

The raw water to be filtered is flowed into the module case 140 through a raw water inlet 141. The raw water flowing into the module case 140 is pressurized by a pump. A portion of the raw water passes through the membrane 110 and comes into the hollow of the membrane 110. The filtered water having come into the hollow of the membrane 110 escapes therefrom through the open end at the first fixing member 120 and is discharged to the outside through the filtered water outlet 142 of the module case 140. The raw water whose solid contaminant concentration becomes higher as the filtration is performed (hereinafter, referred to as "concentrated water") is discharged to the outside through a concentrated water outlet 143.

During filtration or after the filtration is stopped, air is fed into the module case 140 through an air inlet 144 to clean the hollow fiber membrane 110. The second fixing member 130 has a plurality of through holes (H) such that the air fed into the module case 140 through the air inlet 144 could get to the hollow fiber membranes 110.

Optionally, raw water to be filtered and air to clean the hollow fiber membrane 110 may be fed into the module case 140 through one inlet 144. In such a case, both raw water and air pass through a plurality of through holes (H) of the second fixing member 130.

After filtration, raw water present in the module case 140 passes through the through holes (H) of the second fixing member 130 and is discharged to the outside of the module case 140 through a drainage 145.

In a case of the pressurized module 100 described above, if a packing density of hollow fiber membranes 110 present in the module case 140 is excessively high, a space in the module 100 not occupied by the membranes 110, i.e., a space in the module 100 to be filled with raw water, is excessively small, the filtration efficiency decreases, and the membrane contamination is accelerated due to the difficulty in cleaning the membranes 110. Accordingly, one needs to determine the packing density of the hollow fiber membranes 110 of the pressurized module 100 at a suitable level taking the filtration efficiency and easy cleaning into consideration.

When the hollow fiber membrane packing density is set to a predetermined value, the permeation flux of the pressurized module 100 depends on the membrane area of the hollow fiber membranes 110. That is, as the whole membrane area of the bundle of hollow fiber membranes 110 increases, permeation flux of the pressurized module 100 increases. In order to increase the whole membrane area of the hollow fiber membranes 110 while keeping the packing density of the membranes 110 constant, the number of hollow fiber membranes 110 in a unit space should be increased by using the hollow fiber membranes having smaller outer diameter (outer diameter of cross-section of the hollow fiber membrane, the cross-section being perpendicular to the longitudinal direction of the membrane).

For this reason, as compared to a composite hollow fiber membrane in which a polymer resin is coated on a tubular braid, it may be advantageous for production of the pressurized module to use the hollow fiber membranes of a membrane type without reinforcement thus having a small outer diameter. However, since the membrane without reinforcement which, by its definition, does not have a reinforcing braid has relatively weak durability, it is likely to be impaired during the aeration cleaning. More specifically, a pressurized module having a higher packing density of the hollow fiber membranes than a submerged module is very vulnerable to the membrane contamination. Accordingly, the pressurized module requires stronger aeration cleaning during the filtration, as compared to the submerged module. When a hollow fiber membrane without reinforcement having lower durability than a composite hollow fiber membrane is used, the hollow fiber membrane is likely to be impaired due to the strong aeration cleaning. In brief, when a hollow fiber membrane without reinforcement is used for a pressurized module considering filtration efficiency and permeation flux, the durability of the module is disadvantageously deteriorated due to the low strength of the membrane without reinforcement.

Meanwhile, a conventional composite hollow fiber membrane has larger outer diameter than a membrane without reinforcement due to the presence of a tubular braid. The large outer diameter of the composite hollow fiber membrane causes reduction of the membrane area and thus flux when the packing density of the membranes is kept constant.

To solve such problems, there might be suggested a first method of reducing an outer diameter of a composite hollow fiber membrane to increase the membrane area of the hollow fiber membranes in a pressurized module and a second method of improving the durability of a single membrane.

Since a filtration membrane has a plurality of fine pores, there is a limitation in improving the durability of a membrane without reinforcement while maintaining the shape of the membrane. Accordingly, the present invention is focused on the first method, i.e., reduction of the outer diameter of a composite hollow fiber membrane without causing deterioration in permeation flux. Hereinafter, a hollow fiber membrane 110 of a composite membrane type according to one embodiment will be described in more detail.

Figure 2:
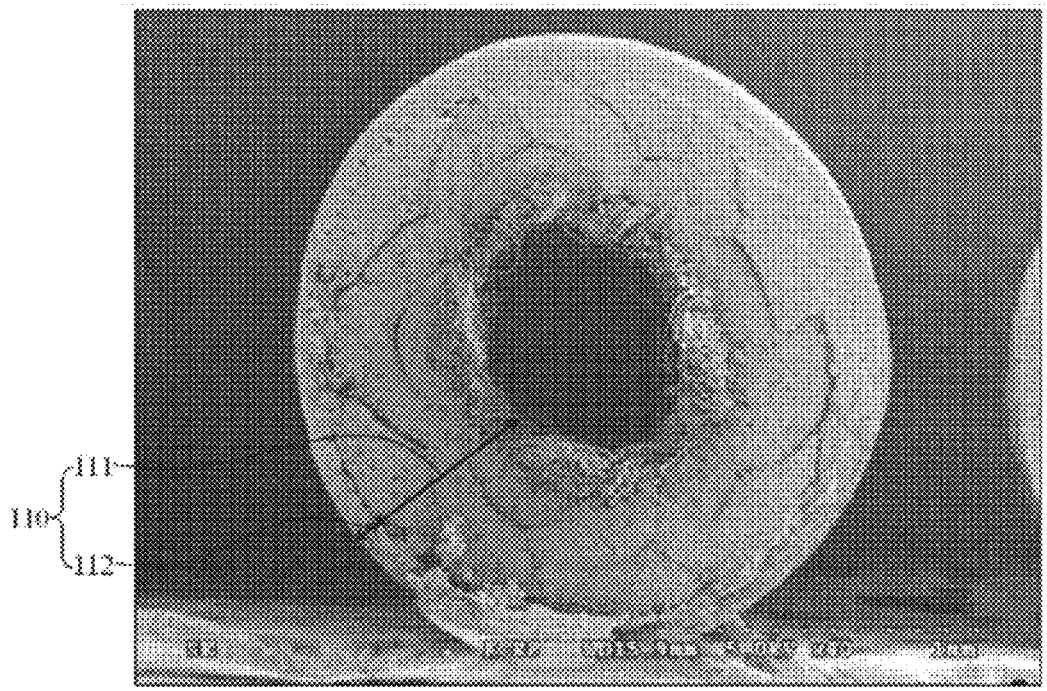
FIG. 2 is an SEM image schematically illustrating the cross-section of the hollow fiber membrane according to one embodiment of the present invention.

FIG. 2 is a schematic cross-sectional view illustrating a hollow fiber membrane according to the present invention.

As shown in FIG. 2, the hollow fiber membrane according to the present invention is a composite hollow fiber membrane 110 in which the surface of a tubular braid 111 is coated with a polymer film 112.

In order to maximize the membrane area of a bundle of composite hollow fiber membranes 110 in the pressurized module 100 having a predetermined packing density, the tubular braid 111 according to one embodiment of the present invention has an outer diameter of 1.2 to 1.7 mm. When the outer diameter of the tubular braid 111 is lower than 1.2 mm, the inner diameter of the composite hollow fiber membrane 110 is also excessively decreased causing lower permeation flux of the module 100 than that of a conventional module of membranes without reinforcement. On the other hand, when the outer diameter of the tubular braid 111 is higher than 1.7 mm, at a predetermined packing density, the membrane area of the bundle of the composite hollow fiber membranes 110 cannot significantly increase.

The term 'packing density' herein used is defined as a ratio (%) of an area corresponding to the bundle of composite hollow fiber membranes among a cross-sectional area of the pressurized module to the cross-sectional area of the module. The cross-section of the pressurized module means a cross-section of the space in the module case. Considering the convenience of production and maintenance of the module 100 and the filtration efficiency, the packing density of the bundle of the composite hollow fiber membranes 110 in the pressurized module 100 of the present invention may be 40 to 70%. If the packing density is lower than 40%, filtering efficiency is decreased due to the reduction of the membrane area. On the other hand, if the packing density is higher than 70%, the filtration efficiency is deteriorated due to the decrease of the space for the raw water in the module 100 and membrane contamination becomes serious.

It is important to reduce the outer diameter of the tubular braid 111 in order to increase the membrane area of the bundle of composite hollow fiber membranes 110 while keeping the packing density of the membranes 110 constant within the above range. At the same time, reduction of the thickness of the tubular braid 111 is also important. The reason for this is that, if the inner diameter of the tubular braid 111 decreases as much as the outer diameter of tubular braid 111 decreases, little increase of permeation flux of the hollow fiber membranes 110, if any, can be expected. Thus, according to the present invention, a ratio of the thickness of the tubular braid 111 to the outer diameter of tubular braid 111 is 15 to 35%.

If the ratio exceeds 35%, i.e., the thickness of tubular braid 111 is excessively large compared with the outer diameter, the inner diameter of tubular braid 111 becomes too small, and problems such as decrease in the amount of the filtered water flowing along the hollow of the composite hollow fiber membrane 110 and decrease in the amount of fluids passing through the membrane due to the large thickness of the composite hollow fiber membrane 110 occur.

On the other hand, if the ratio is lower than 15%, i.e., the thickness of the tubular braid 111 is excessively small compared with the outer diameter, the reinforcement function of the tubular braid 111 cannot be secured.

According to one embodiment of the present invention, the tubular braid 111 has an outer diameter of 1.2 to 1.7 mm and a thickness of 0.18 to 0.59 mm.

The outer diameter, inner diameter and thickness of the tubular braid 111 are measured in accordance with the following method.

In order to fix the shape of the tubular braid 111, the outer surface of the tubular braid 111 is coated with paraffin. Any substance may be used for coating so long as it can fix the shape of the tubular braid 111. For example, instead of paraffin, a polymer resin for production of composite hollow fiber membrane may be coated on the tubular braid 111. Subsequently, the tubular braid 111 coated with paraffin is cut at a predetermined point in a direction perpendicular to the longitudinal direction thereof with a microtome for FE-SEM cross-section cutting to obtain a cross-section sample of the braid 111. Then, the cross-section is analyzed with FE-SEM. Five samples each of which has outer and inner diameters each of which has longest and shortest lengths whose difference is 20% or lower of the longest length are selected. The outer diameter of the sample is determined as an average of the largest outer diameter and the smallest outer diameter, and the inner diameter thereof is determined as an average of the largest inner diameter and the smallest inner diameter. An arithmetic mean of each of outer diameter and inner diameter of five samples is calculated to finally obtain an outer diameter and an inner diameter of the tubular braid 111. The thickness (average thickness) of the tubular braid 111 is determined to be the difference between the outer diameter and the inner diameter thereof.

In order to produce the tubular braid 111 of the present invention, a yarn comprising a small-fineness filament(s) and a medium-fineness filament(s) is used for production of the tubular braid 111. In addition to such a yarn, a yarn comprising only small-fineness filaments and/or a yarn comprising only medium-fineness filaments may be used to produce the tubular braid 111.

The term "small-fineness filament" used herein is defined as a filament comprising monofilaments having a fineness of 0.01 to 0.4 denier, and the term "medium-fineness filament" is defined as a filament comprising monofilaments having a fineness higher than 0.4 and lower than 3 denier. Besides the small-fineness filament and medium-fineness filament, a filament comprising monofilament(s) having a fineness of 3 denier or higher is generally classified into "large-fineness filament".

For the clarification, every each yarn of the invention used for manufacturing a tubular braid 111 comprises only small-fineness filament(s) and/or medium-fineness filament(s), and has no large-fineness filament.

Each small-fineness filament constituting the yarn according to the present invention comprises 100 to 300 monofilaments and has a fineness of 1 to 120 denier. The small-fineness filament may comprise a polyolefin resin, polyethylene terephthalate (PET) or nylon.

Each medium-fineness filament constituting the yarn according to the present invention comprises 30 to 200 monofilaments and has a fineness of 12 to 600 denier. The medium-fineness filament may comprise a polyolefin resin, polyethylene terephthalate (PET) or nylon.

Preferably, each of the yarns used for production of the tubular braid 111 of the present invention comprises 1 to 4 small-fineness filament(s) and 1 to 4 medium-fineness filament(s). A sum of the small-fineness filaments and medium-fineness filaments constituting the yarn is 3 or more and each yarn has a fineness of 150 to 600 denier.

According to one embodiment of the present invention, a tubular braid 111 is produced with 8 to 24 yarns.

Since the tubular braid 111 of the present invention comprises small-fineness filament(s) having a plurality of monofilaments having a fineness of 0.01 to 0.4 denier, the contact area between the tubular braid 111 and the polymer film 112 is relatively large. The large contact area between the tubular braid 111 and the polymer film 112 imparts superior peeling strength to the composite hollow fiber membrane 110 of the present invention. That is, since a large strength is required to peel off the polymer film 112 coated on the tubular braid 111, the composite hollow fiber membrane 110 according to the present invention can be maintained for a long time without separation of the polymer film 112 from the tubular braid 111 in spite of strong aeration cleaning.

Meanwhile, if every each yarn used for production of the tubular braid 111 is composed of only small-fineness filaments, it is difficult to produce a tubular braid 111 having an outer diameter of 1.7 mm or less.

In order to solve this kind of problem, it might be suggested to blend small-fineness filament(s) with large-fineness filament(s) to produce a yarn. However, since the fineness difference between the monofilament constituting a small-fineness filament and the monofilament constituting a large-fineness filament is so big that non-uniformity of the thickness of the tubular braid 111 becomes serious. If the thickness non-uniformity of the tubular braid 111 increases, the polymer film 112 can hardly be coated on the tubular braid 111 uniformly. As a result, the membrane 110 is more likely to be impaired at the region of the membrane 110 where the polymer film 112 is relatively thin.

Thus, according to a preferred embodiment of the present invention, yarns are produced by mixing small-fineness filaments with medium-fineness filaments and a tubular braid 111 is produced with these yarns, so that the tubular braid 111 can have an outer diameter of 1.2 to 1.7 mm and a ratio of the thickness to the outer diameter of 15 to 35%.

On the tubular braid 111 thus produced is coated a polymer film 112 comprising at least one of a polysulfone resin, a polyethersulfone resin, a sulfonated polysulfone resin, a polyvinylidene fluoride (PVDF) resin, a polyacrylonitrile (PAN) resin, a polyimide resin, a polyamideimide resin and a polyesterimide resin to complete a composite hollow fiber membrane 110 having superior peeling strength of 1 to 5 MPa.

The polymer film 112 may include a skin layer having a dense structure and an inner layer having a sponge structure. The skin layer includes fine pores having a pore size of 0.01 to 1 μm and the inner layer includes fine pores having a pore size of 10 μm or less, more preferably, 5 μm or less. According to the present invention, defective regions larger than 10 μm, that is, fine pores having a pore size exceeding 10 μm are not present in the inner layer of the polymer film 112. When the inner layer includes defective regions exceeding 10 μm, filtration reliability may remarkably decrease. It is more preferable that the pore sizes of fine pores formed in the inner layer having a sponge structure gradually increase toward the center of the composite hollow fiber membrane 110.

It is desirable that the thickness of polymer film 112 is 0.2 mm or less and the distance by which the polymer film 112 permeates into the tubular braid 111 is lower than 30% of the thickness of the tubular braid 111 to improve both mechanical strength and water permeability of the membrane 110.

The composite hollow fiber membrane 110 of the present invention may be produced by passing through the tubular braid 111 via a double tubular nozzle center, feeding a spinning dope for the polymer film onto the surface of the tubular braid 111 thereby coating the spinning dope thereon, discharging the spinning dope-coated tubular braid 111 into the air outside the nozzle, coagulating the dope in a coagulation solution to complete a composite hollow fiber membrane structure, and washing and drying the structure.

In order to uniformly coat a polymer film 112 to a predetermined thickness on the surface of the tubular braid 111, movement speed of the tubular braid 111 should be balanced with the amount of spinning dope fed into the nozzle, and the following equation shows such relation using a spinning dope feed speed (Q) and the tubular braid speed (υ):

$$Q = \pi \rho \upsilon D_o T$$

[wherein Q is an amount of spinning dope fed per hour, ρ is a density of spinning dope, υ is a movement speed of tubular braid, $D_o$ is an outer diameter of tubular braid, and T is a thickness of coated spinning dope]

As can be seen from the equation above, the thickness of polymer film 112 may be controlled using the amount of spinning dope fed, the density of spinning dope, movement speed of tubular braid 111 or the like.

The spinning dope for the polymer film is prepared by dissolving a polymer resin, and polyvinyl pyrrolidone and a hydrophilic compound as additives, in an organic solvent. The spinning dope may comprise 10 to 50% by weight of the polymer resin, 1 to 30% by weight of additives (polyvinyl pyrrolidone and/or hydrophilic compound), and 20 to 89% by weight of the organic solvent.

As the polymer resin, at least one of a polysulfone resin, a polyethersulfone resin, a sulfonated polysulfone resin, a polyvinylidene fluoride (PVDF) resin or a polyacrylonitrile (PAN) resin, a polyimide resin, a polyamideimide resin and a polyesterimide resin may be used. As the organic solvent, dimethylacetamide, dimethylformamide or a mixture thereof may be used.

As the hydrophilic compound, water or a glycol compound, more preferably, polyethylene glycol having a molecular weight of 2,000 or less is used. Water or a glycol compound which is a hydrophilic compound deteriorates stability of spinning dope and thus increases a possibility that a sponge structure appears in the polymer film 112.

That is, as stability of the spinning dope increases, defective regions (having fine pores having a pore size exceeding 10 μm) are likely to be formed in the film, and the film thus tends to have a finger-like structure. For this reason, by adding a hydrophilic compound such as water or a glycol compound as an additive, the stability of spinning dope can be deteriorated, the film can be hydrophilized and water permeation of the composite hollow fiber membrane 110 can be increased.

Hereinafter, the present invention will be described in more detail with reference to Examples and Comparative Examples.

Example 1

A yarn was produced by blending 2 small-fineness filaments, each comprising 200 PET monofilaments having a fineness of 0.31 denier, with one medium-fineness filament comprising 72 PET monofilaments having a fineness of 2 denier. The 20 yarns so made were used to produce a tubular braid having an outer diameter of 1.4 mm and a thickness of 0.4 mm.

Example 2

A yarn was produced by blending 2 small-fineness filaments, each comprising 100 PET monofilaments having a fineness of 0.31 denier, with one medium-fineness filament comprising 36 PET monofilaments having a fineness of 2 denier. The 20 yarns so made were used to produce a tubular braid having an outer diameter of 1.2 mm and a thickness of 0.3 mm.

Comparative Example 1

A yarn was produced with 6 small-fineness filaments each comprising 200 PET monofilaments having a fineness of 0.31 denier. The 20 yarns so made were used to produce a tubular braid having an outer diameter of 1.9 mm and a thickness of 0.6 mm.

Measurement of Outer Diameter, Inner Diameter and Thickness of Tubular Braid

The outer diameter, inner diameter and thickness of tubular braids produced in Examples 1 and 2 and Comparative Example 1 were measured in accordance with the following method.

In order to fix the shape of the tubular braid, the outer surface of tubular braid was coated with paraffin. Subsequently, the tubular braid coated with paraffin was cut at a predetermined point in a direction perpendicular to the longitudinal direction thereof with a microtome for FE-SEM cross-section cutting to obtain a cross-section sample of the braid. Then, the cross-section was analyzed with FE-SEM. Five samples each of which had outer and inner diameters each of which had longest and shortest lengths whose difference was 20% or lower of the longest length were selected. The outer diameter of the sample was determined as an average of the largest outer diameter and the smallest outer diameter, and the inner diameter thereof was determined as an average of the largest inner diameter and the smallest inner diameter. An arithmetic mean of each of outer diameter and inner diameter of five samples was calculated to finally obtain an outer diameter and an inner diameter of the tubular braid. The thickness (average thickness) of the tubular braid 111 was determined to be the difference between the outer diameter and the inner diameter thereof.

TABLE 1

|  | Ex. 1 | Ex. 2 | Comp. Ex. 1 |
|---|---|---|---|
| Outer diameter of tubular braid (mm) | 1.4 | 1.2 | 1.9 |
| Thickness of tubular braid (mm) | 0.4 | 0.3 | 0.6 |

Example 3

17% by weight of polysulfone, 9% by weight of polyvinyl pyrrolidone and 10% by weight of polyethylene glycol were dissolved in 64% by weight of dimethylformamide (organic solvent) while stirring, to prepare a transparent spinning dope. Subsequently, the spinning dope was fed into a double tubular nozzle having a diameter of 2.38 mmϕ and at the same time, the tubular braid produced in Example 1 was passed through the nozzle center, to coat the surface of the tubular braid with the spinning dope, and the tubular braid was discharged to the air. At this time, a ratio (κ) of the feed speed of spinning dope to movement speed of tubular braid was 750 g/m². The spinning dope-coated tubular braid was passed through a 10 cm air gap and was passed through a 35° C. coagulation bath and then coagulated. Subsequently, the braid was cleaned in a cleaning bath and wound to produce a composite hollow fiber membrane. The tubular braid-coated polymer film had a thickness of 0.1 mm.

Example 4

A composite hollow fiber membrane was produced in the same manner as Example 3, except that the tubular braid produced in Example 2 was used, instead of the tubular braid produced in Example 1.

Comparative Example 2

A composite hollow fiber membrane was produced in the same manner as Example 3, except that the tubular braid produced in Comparative Example 1 was used, instead of the produced tubular braid produced in Example 1.

Comparative Example 3

35% by weight of polyvinylidene fluoride (PVDF), 45% by weight of γ-butyrolactone (GBL), 5% by weight of dimethylacetamide (DMAc), 5% by weight of polyvinyl pyrrolidone (PVP), and 10% by weight of dimethyl glycol (DEG) were mixed and stirred at about 120☐ for 24 hours to prepare a spinning solution. The spinning solution thus prepared was ejected through a spinneret to obtain a spun substance. During ejection of the spinning solution, a solution comprising 20% by weight of dimethylacetamide (DMAc) and 80% by weight of polyethylene glycol (PEG) was ejected into the hollow of the spun substance. The spun substance was passed through an air cap having a length of 30 cm and was then immersed in the coagulation solution contained in the coagulation bath. The coagulation solution was prepared using 80% by weight of γ-butyrolactone (GBL), and 20% by weight of pure water and the temperature of the coagulation solution was maintained at 25☐. The porous structure coagulated in the coagulation bath was cleaned with 25☐ pure water, hydrothermally treated using an 80☐ post-treatment solution comprising water and glycerin, and dried to obtain a hollow fiber membrane without reinforcement.

The outer diameter and tensile strength of hollow fiber membranes produced in Examples 3 and 4 and Comparative Examples 2 and 3 were measured in accordance with the following method and the results are shown in Table 2 below.

Measurement of Outer Diameter of Hollow Fiber Membrane

The outer diameters of hollow fiber membranes produced in Examples 3 and 4 and Comparative Examples 2 and 3 were measured in accordance with the following method.

A composite hollow fiber membrane was cut at a predetermined point in a direction perpendicular to the longitudinal direction thereof with a microtome for FE-SEM cross-section cutting to obtain a cross-section sample of the membrane. Then, the cross-section was analyzed with FE-SEM. Five samples each of which had outer diameters of longest and shortest lengths whose difference was 20% or lower of the longest length were selected. The outer diameter of the cross-section sample was determined as an average of the largest outer diameter and the smallest outer diameter. An arithmetic mean of the outer diameters of five samples was calculated to finally obtain an outer diameter of the hollow fiber membrane.

Measurement of Tensile Strength

A hollow fiber membrane sample having a length of 100 mm was prepared, fixed at upper and lower action grips using Instron 4304 and 1N cell, and was drawn at a crosshead speed of 50.0 mm/min to measure a tensile strength of the sample.

TABLE 2

|  | Ex. 3 | Ex. 4 | Comp. Ex. 2 | Comp. Ex. 3 |
|---|---|---|---|---|
| Outer diameter of hollow fiber membrane (mm) | 1.6 | 1.4 | 2.1 | 1.5 |
| Tensile strength (Kgf) | 25.1 | 24.9 | 25.4 | 0.8 |

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A pressurized hollow fiber membrane module comprising:
a module case having a raw water inlet and a filtered water outlet;
a bundle of composite hollow fiber membranes disposed in the module case;
a first fixing member in which one ends of the composite hollow fiber membranes are potted, the first fixing member being fixed on an inner surface of the module case; and
a second fixing member in which the other ends of the composite hollow fiber membranes are potted, the second fixing member being fixed on the inner surface of the module case,
wherein each of the composite hollow fiber membranes comprises a tubular braid woven by yarns and a polymer film on an outer surface of the tubular braid,
wherein at least one of the yarns comprises a small-fineness filament and a medium-fineness filament,
wherein the small-fineness filament comprises first monofilaments having a fineness of 0.01 to 0.4 denier,
wherein the medium-fineness filament comprises second monofilaments having a fineness higher than 0.4 and lower than 3, and
wherein a ratio of thickness of the tubular braid to outer diameter thereof is 15 to 35%.

2. The pressurized hollow fiber membrane module according to claim 1, wherein the tubular braid has an outer diameter of 1.2 to 1.7 mm and a thickness of 0.18 to 0.59 mm.

3. The pressurized hollow fiber membrane module according to claim 1, wherein the composite hollow fiber membrane bundle has a packing density of 40 to 70%, wherein the packing density is a ratio of an area corresponding to the composite hollow fiber membranes among a cross-sectional area of the pressurized hollow fiber membrane module to the cross-sectional area.

4. The pressurized hollow fiber membrane module according to claim 1, wherein the small-fineness filament and the medium-fineness filament comprise a polyolefin resin, polyethylene terephthalate, or nylon, and
wherein the polymer film comprises at least one of a polysulfone resin, a polyethersulfone resin, a sulfonated polysulfone resin, a polyvinylidene fluoride resin, a polyacrylonitrile resin, a polyimide resin, a polyamide-imide resin, and a polyesterimide resin.

5. The pressurized hollow fiber membrane module according to claim 1, wherein the small-fineness filament comprises 100 to 300 first monofilaments and has a fineness of 1 to 120 denier, and
wherein the medium-fineness filament comprises 30 to 200 second monofilaments and have a fineness of 12 to 600 denier.

6. The pressurized hollow fiber membrane module according to claim 5, wherein each of the yarns comprises 1 to 4 small-fineness filament(s) and 1 to 4 medium-fineness filament(s), and
wherein a sum of the small-fineness filament(s) and the medium-fineness filament(s) in each of the yarns is 3 or more.

7. The pressurized hollow fiber membrane module according to claim 1, wherein each of the yarns has a fineness of 150 to 600 denier.

8. The pressurized hollow fiber membrane module according to claim 5, wherein the tubular braid is woven with 8 to 24 yarns.

* * * * *